(12) United States Patent
Spier et al.

(10) Patent No.: US 8,554,567 B2
(45) Date of Patent: Oct. 8, 2013

(54) MULTI-CHANNEL INTERACTIVE SELF-HELP APPLICATION PLATFORM AND METHOD

(75) Inventors: Harm-Jan Spier, Orlando, FL (US); Jonathan Robert Taylor, Orlando, FL (US); Robert J. Auburn, Orlando, FL (US); David Hoff, Orlando, FL (US); Adam David Kalsey, Fair Oaks, CA (US); Anthony James Webb, Firth, ID (US); Alexander S. Agranovsky, Longwood, FL (US)

(73) Assignee: Voxeo Corporation, Orlando, FL (US)

( * ) Notice: Subject to any disclaimer, the term of this patent is extended or adjusted under 35 U.S.C. 154(b) by 425 days.

(21) Appl. No.: 12/860,719

(22) Filed: Aug. 20, 2010

(65) Prior Publication Data

US 2011/0046960 A1    Feb. 24, 2011

Related U.S. Application Data

(60) Provisional application No. 61/236,031, filed on Aug. 21, 2009.

(51) Int. Cl.
*G10L 21/00* (2013.01)
(52) U.S. Cl.
USPC ........ 704/270; 704/270.1; 704/275; 704/231; 704/235; 704/251

(58) Field of Classification Search
USPC ............... 704/270, 270.1, 275, 231, 235, 251
See application file for complete search history.

(56) References Cited

U.S. PATENT DOCUMENTS

| 6,922,411 | B1 | 7/2005 | Taylor |
| 7,068,643 | B1 * | 6/2006 | Hammond ................... 370/352 |
| 2005/0027536 | A1 * | 2/2005 | Matos et al. ............... 704/270.1 |
| 2006/0041431 | A1 * | 2/2006 | Maes ......................... 704/270.1 |
| 2010/0306154 | A1 * | 12/2010 | Poray et al. .................... 706/47 |

* cited by examiner

*Primary Examiner* — Qi Han
(74) *Attorney, Agent, or Firm* — Davis Wright Tremaine LLP (57) ABSTRACT

An interactive voice response (IVR) platform running a voice application for use with a voice client is extended to support text messaging clients and other clients of other media types on other channels. An application-to-text messaging interface interfaces with text messaging clients via a text messaging protocol transport and interfaces with the IVR via an API. It includes a user/application manager to handle user and application accounts and a state/session manager to handle state information required by the text messaging operations and to handle sessions maintained by the IVR. Text modules are implemented having text synthesis and text recognition with a dictionary/grammar. These allow voice-specific application scripts to be interpreted in a text channel. The extended multi-channel platform supports an open source text messaging network and also through a transport gateways to other types of text messaging clients.

16 Claims, 7 Drawing Sheets

Interactive Voice Response (IVR) Environment

FIG. 1 (PRIOR ART)

Text Messaging Environment

Multiple Channels Interacting with a Dialog-based, Self-Help Application

FIG. 4

| AppKey | CN | Addressee | UserKey | Network | UserName | Msg |

Example Fields for maintaining State and Session

Backward Compatible with Legacy IVR Scripts

MULTI-CHANNEL INTERACTIVE SELF-HELP APPLICATION PLATFORM AND METHOD

CROSS-REFERENCE TO RELATED APPLICATION

The benefit is claimed of U.S. provisional patent application of Harm-Jan Spier, Jonathan Robert Taylor, RJ Auburn, David Hoff, Adam David Kalsey, Anthony James Webb and Alex S. Agranovsky, Application No. 61/236,031 filed on Aug. 21, 2009.

FIELD OF THE INVENTION

The present invention relates to telecommunication and networked computer and computer telephony systems including the Internet and the Public Switched Telephone System, and more particularly to an interactive self-help application platform supporting multi-channels.

BACKGROUND OF THE INVENTION

Two major telecommunication networks have evolved worldwide. The first is a network of telephone systems in the form of the Public Switched Telephone System (PSTN). This network was initially designed to carry voice communication, but later also adapted to transport data. The second is a network of computer systems in the form of the Internet. The Internet has been designed to carry data but also increasingly being used to transport voice and multimedia information. Computers implementing telephony applications have been integrated into both of these telecommunication networks to provide enhanced communication services. For example on the PSTN, computer telephony integration has provided more functions and control to the POTS (Plain Old Telephone Services). On the Internet, computers are themselves terminal equipment for voice communication as well as serving as intelligent routers and controllers for a host of terminal equipment.

The Internet is a worldwide network of IP networks communicating under TCP/IP. Any type of media is packaged and transported in packets. Personal communication over the Internet is usually done with text messages under a number of protocols. Voice and other multimedia information are typically transported on the Internet under the VoIP (Voice-over-IP) protocol, and various standards that have been put forward for interoperability. Another important implementation of VOIP protocol is SIP ("Session Initiation Protocol".)

The integration of the PSTN and the IP networks allows for greater facility in automation of voice applications by leveraging the inherent routing flexibility and computing accessibility in the IP networks.

Figure 1:
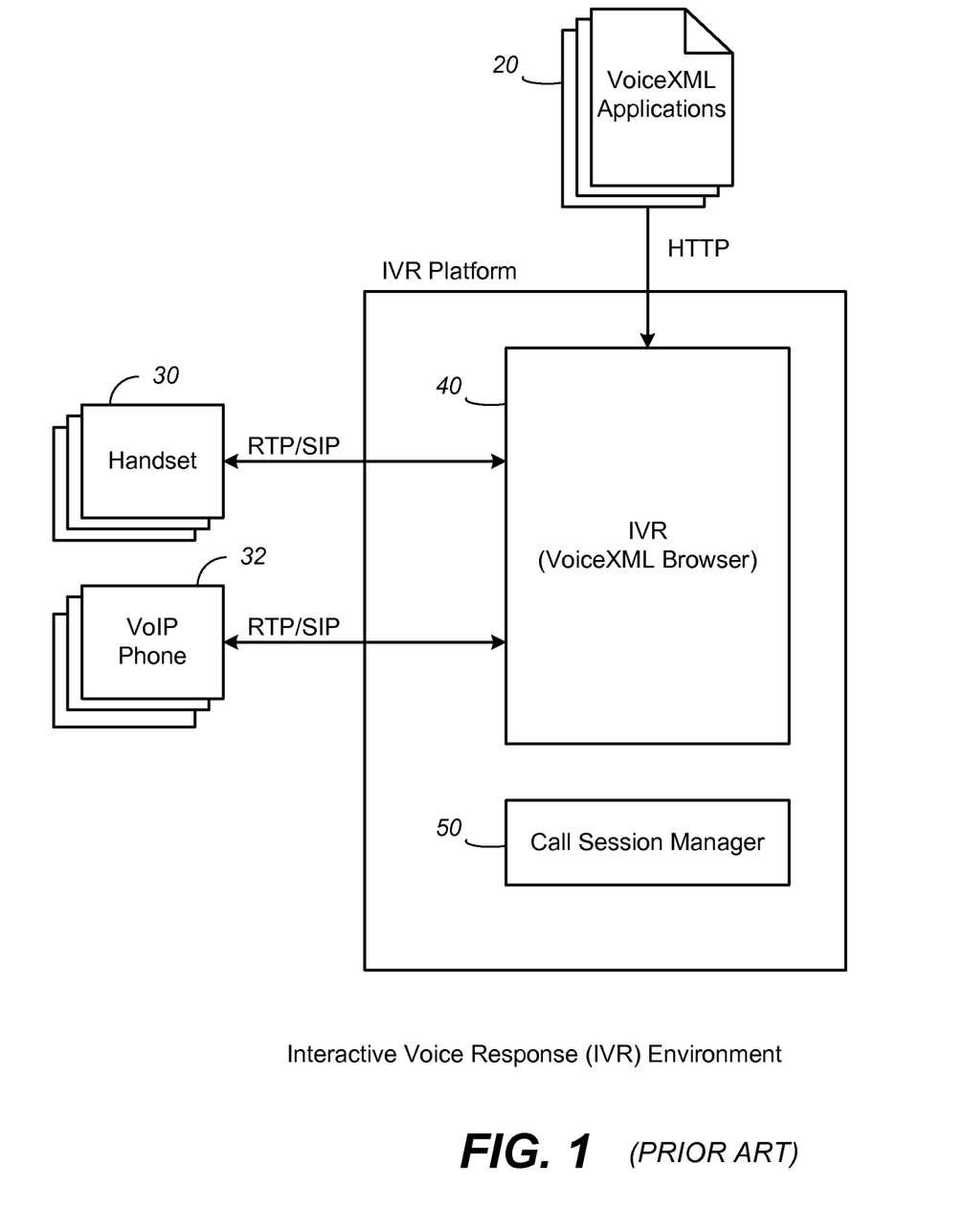
FIG. 1 illustrates schematically an Interactive Voice Response ("IVR") platform.

FIG. 1 illustrates schematically an Interactive Voice Response ("IVR") platform. IVR is a technology that automates interaction with telephone callers. For example, enterprises are increasingly turning to IVR to reduce the cost of common sales, service, collections, inquiry and support calls to and from their company.

Historically, IVR solutions have used pre-recorded voice prompts and menus to present information and options to callers, and touch-tone telephone keypad entry to gather responses. Modern IVR solutions also enable input and responses to be gathered via spoken words with voice recognition.

IVR solutions enable users using voice as a medium or other form of inputs through a voice channel to retrieve information including bank balances, flight schedules, product details, order status, movie show times, and more from any telephone. Additionally, IVR solutions are increasingly used to place outbound calls to deliver or gather information for appointments, past due bills, and other time critical events and activities.

FIG. 1 illustrates the IVR platform that supports and runs a voice application to direct how a call is to be handled. A voice application 20 is specified by a voice application script with codes having voice-specific statements. For example, such voice-specific statements can include VoiceXML tags. When a user makes a call through a voice client such as a handset 30 or a VoIP phone 32 to the IVR 10, the voice application script associated with the call number is retrieved. A voice browser 40 is one that is designed to execute or render the retrieved voice application script to allow the user to interact with the voice application.

One feature of the IVR platform is that each call connection is of finite time. Traditionally, a call connection through a circuit-switched network consumes bandwidth and resources that have toll charges associated with them. The same is true to a lesser degree even if the call is routed through an IP network. Therefore, a call connection is maintained as long as it is needed, and when no further activities are forth coming, the call is terminated. Thus, calls are conducted in well defined call sessions.

FIG. 1 also shows a call session manager in the IVR platform. The call session manager 50 is used to manage a call session. It sets up a call and its routing, maintains it and eventually tears it down. The session manager is responsible for creating new sessions, deleting terminated sessions, routing all actions and events to the appropriate modules and maintaining modularity between each session. It responds to I/O and goto requests, and other additional events. One important function of the session manager is to perform call control operations. For example, in the context of VoIP, it is implemented as a SIP controller (e.g., driven by CCXML (Call Control XML) scripts.)

A session begins with the reception of an asynchronous event signaling an incoming call. The Session Manager then creates a session for this call by accessing a database keyed on the session's DNS and ANI information, which returns an initial Application script. A cycle of actions and events begins with the transmission of this script to be parsed and to generate action requests collected from the parsing of the script. The Session Manager processes these action requests and then returns to parsing until the end of the session.

An example of an IVR platform is described in U.S. Pat. No. 6,922,411, which entire disclosure is incorporated herein by reference.

Figure 2:
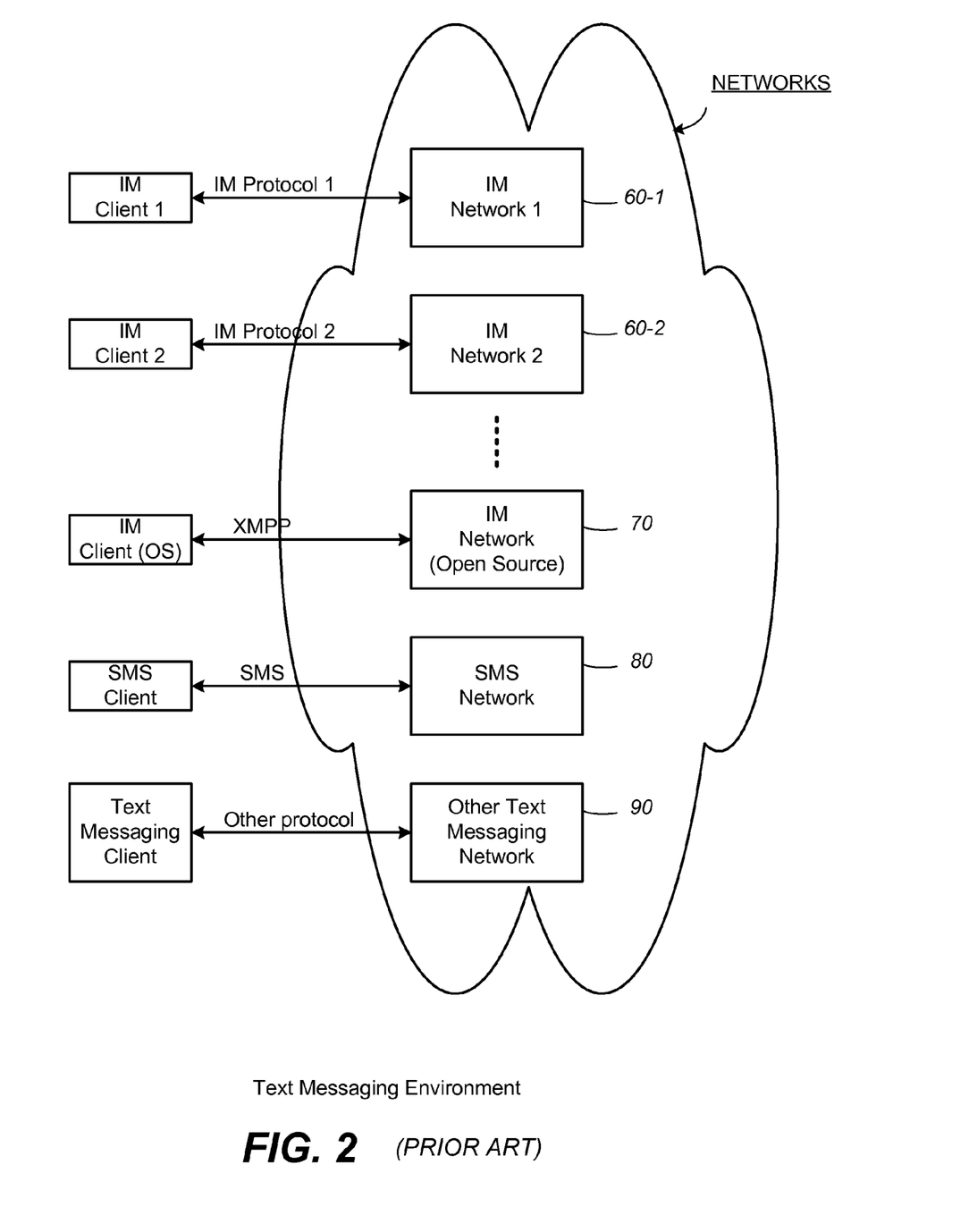
FIG. 2 is a schematic illustration of a general text messaging environment.

FIG. 2 is a schematic illustration of a general text messaging environment. Text messaging is a form of communication by exchange of text messages from point to point or point to multiple points. Most common forms of text messaging are email, web blog and instant messaging. Instant messaging ("IM") exchanges messages almost in real-time. There are a number of proprietary instant messaging networks, depicted as IM Network 1 60-1, IM Network 2 60-2, . . . , each providing IM service to each own clients using a native protocol. An open source IM Network 70 also exists and uses the XMPP protocol. XMPP refers to Extensible Messaging and Presence Protocol and it is a set of open XML technologies for presence and real-time communication developed by the Jabber open-source community in 1999. Also there are some standards and networks designed for short message transmission suitable for the mobile environment and portable clients. SMS (Short Message Service) 80 is one such standard. Other text messaging networks 90 also exist. For example, email, Twitter (not shown) is another network providing micro-blogging service.

An IVR is a specific example of a self-help application in which users can help themselves by interacting with the application to perform some tasks. A traditional IVR only allows users to interact with it through a voice channel. Similarly, a web bot is a specific example of a self-help application that allows users to perform tasks using a text channel.

It is desirable to have a self-help application that allows interaction with different media, such as voice in one channel and text messaging in another channel. However, the context and characteristics of operating with voice versus with text are quite different that a multi-channel (including voice and text) self-help application having a common application script has not been realized.

SUMMARY AND OBJECTS OF THE INVENTION

An interactive voice response (IVR) platform running a voice application for use with a voice client is extended to support text messaging clients and other clients of other media types on other channels. This is accomplished by an application-to-text messaging interface that on the one hand interfaces with text messaging clients via a text messaging protocol transport, and on the other hand interfaces with the IVR via an application program interface for the IVR.

In a preferred embodiment, the application-to-text interface includes a user/application manager to handle user accounts for the text messaging clients and application accounts for the IVR. It also includes and a state/session manager to handle state information required by the text messaging operations and to handle sessions maintained by the IVR. Text modules are implemented having text synthesis and text recognition with a dictionary/grammar. These allow voice-specific application scripts to be interpreted in a text channel. The extended multi-channel platform supports an open source text messaging network and also through a transport gateways to other types of text messaging clients.

In another embodiment, instead of coding the application with voice-specific codes, it is being coded with a set of generalized dialog-specific statements for specifying a dialog-based self-help application. A script browser is configured to parse and execute these dialog-specific statements. The script can either be interpreted and executed line by line or compiled into a runtime object code for the browser to execute the object code.

Additional objects, features and advantages of the present invention will be understood from the following description of its preferred embodiments, which description should be taken in conjunction with the accompanying drawings.

DESCRIPTION OF THE PREFERRED EMBODIMENTS

Figure 3:
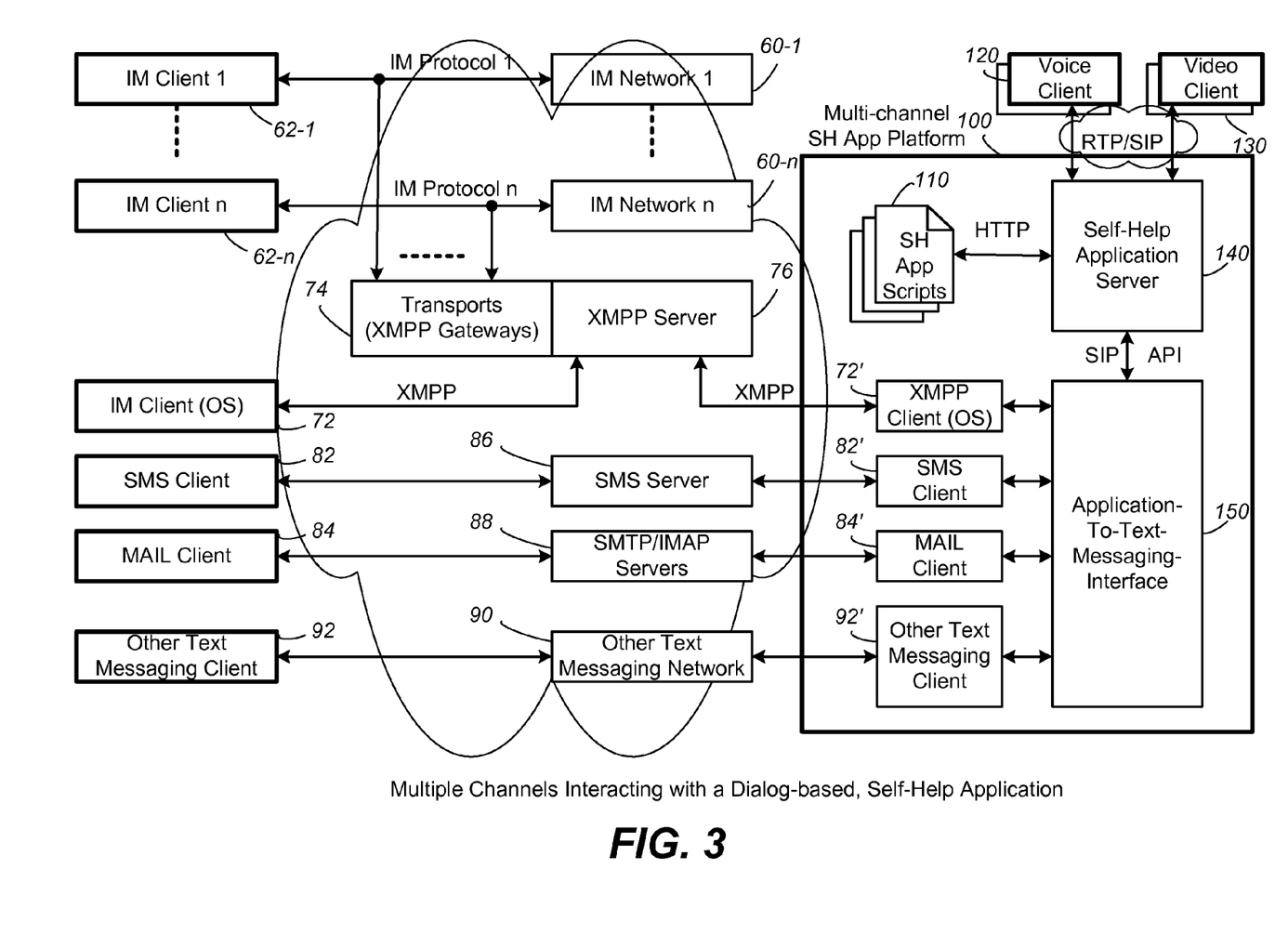
FIG. 3 illustrates a multi-channel, self-help application platform, according to a preferred embodiment of the invention.

FIG. 3 illustrates a multi-channel, self-help application platform, according to a preferred embodiment of the invention. Essentially, a multi-channel, self-help application platform 100 hosts one or more self-help applications 110 for interactions with various clients via multiple channels. The different clients include a voice client 120 where the mode of communication is via a voice channel. They also include text messaging clients where the mode of communication is via various text messaging channels. The self-help application can also interact with a video client 130 via a channel for passing video as media.

The voice client 120 will interact with the self-help application 110 as if the self-help application is an IVR, similar to that described in FIG. 1.

Some actions in speech applications may find correspondence to text messaging applications. For example, playing an audio file is similar to sending a file over IM, recording a call is similar to recording a text messaging conversation, transferring a call is similar to setting up a chat (involving multiple IM users).

The text messaging clients will interact with the self-help application 110 as if the self-help application is a web bot. FIG. 3, similar to FIG. 2, shows a variety of text messaging clients communicating and using services within their own networks. A popular class of text messaging is Instant Messaging ("IM") where exchange of text messages between parties is almost in real-time. An IM client 1 62-1 communicates with an IM network 1 60-1 using IM protocol 1. An IM client n 62-n communicates with an IM network n 60-n using IM protocol n, etc. An open source IM client (OS) 72 or (XMPP client) communicates with an open source network having an XMPP server 76. Examples of the various native IM networks are AOL Instant Messenger, MSN Messenger, Yahoo Messenger, Lotus Sametime, Google Talk, etc.

Generally, Each IM network operates under its own native protocol and they are not interoperable. Another class of IM networks is based on the open standard of XMPP as described earlier. A jabber server provides IM service to its clients. Google Talk is another one that is based on the XMPP standard.

In the preferred embodiment, the XMPP server 76 is used as a bridge for the multi-channel, self-help application platform to interoperate with the various different IM networks. A transports module 74 is employed, which acts as a XMPP gateway to the various IM networks. To the XMPP server 76 the multi-channel, self-help application platform 100 would just be another XMPP client 72'. In this way, the various IM clients are able to communicate with the multi-channel, self-help application platform via the transports module and the XMPP server. When the IM client, such as 72 and 72', is already part of the XMPP network 70, it will not need to be "transported" by the transports module, but simply talk directly with the XMPP server 76.

FIG. 3 also illustrates the multi-channel self-help application platform operating with other text messaging clients. The more mobile clients among these include SMS 82, USSD, telnet, SSH, twitter, mail 84, etc. Each of other text messaging clients 92 generally operates in its own text messaging network 90. SMS refers to Short Message Service and is a communication service standardized in the GSM mobile communication system. It has become so popular that the term is becoming somewhat generic with text messaging using standardized communications protocols that allow the interchange of short text messages between mobile telephone devices. USSD refers to Unstructured Supplementary Service Data and is a capability of all GSM phones. Since its response time is faster than SMS, it is generally associated with real-time or instant messaging type phone services. Telnet (teletype network) is a network protocol used on the Internet or local area networks to provide a bidirectional interactive communications facility. SSH refers to Secure Shell and is a network protocol that allows data to be exchanged using a secure channel between two networked devices. SSH was designed as a replacement for Telnet and other insecure remote shells, which sends sensitive information such as passwords in plaintext, leaving them open for interception. Twitter is a web service for micro-blogging.

The relatively slower responding clients among the other text messaging clients include email clients 84, which could operate under a number of protocols, such as SMTP, POP and IMAP. SMTP refers to Simple Mail Transfer Protocol and is an Internet standard for electronic mail (e-mail) transmission across Internet Protocol (IP) networks. POP (Post Office Protocol) and IMAP (Internet Message Access Protocol) are the two most prevalent Internet standard protocols for e-mail retrieval.

FIG. 3 shows schematically that each of the above-mentioned clients is able to exchange messages and therefore interacts with the multi-channel, self-help application platform. For each client, the platform 100 provides a counterpart local client to communicate with it through each client's native network or server. Thus, the multi-channel, self help application platform effectively provide multiple channels, each one suitable for exchanging messages with a particular text messaging client.

The multi-channel, self-help application platform 100 includes one or more self-help application server 140 that hosts a dialog-based self-help application 110. Each self-help application is specified by a self-help application script. The script comprises of dialog-based statements which establish a dialog with each of the engaging clients.

The multi-channel, self-help application platform 100 provides a voice channel for interaction with the voice client 120, such as a handset or a VoIP phone. In one embodiment, the dialog-specific statements include VoiceXML tags. The self-help application server 140 includes a VoiceXML browser and other resources so that the browser is able to execute the script and to behave like an IVR to the voice client 120, similar to that shown in FIG. 1. In another embodiment, the dialog-specific statements include SCXML tags. SCXML refers to State Chart XML: State Machine Notation for Control Abstraction. It is an XML-based markup language which provides a generic state-machine based execution environment based on Harel statecharts. In yet other embodiments, the dialog specific statements are coded in JavaScript and/or other programming languages.

Similarly, the multi-channel, self-help application platform 100 provides a video channel for interaction with the video client 130, such as a smart phone able to handle video.

An application-to-text-messaging interface 150 allows each of the local text messaging clients such as local XMPP client 72', local SMS client 82', local mail client 84' and local other text messaging client 92', to interact with the self-help application server 140. In this way, a user can interact with the self-help application through any one of the text messaging clients.

Figure 4:
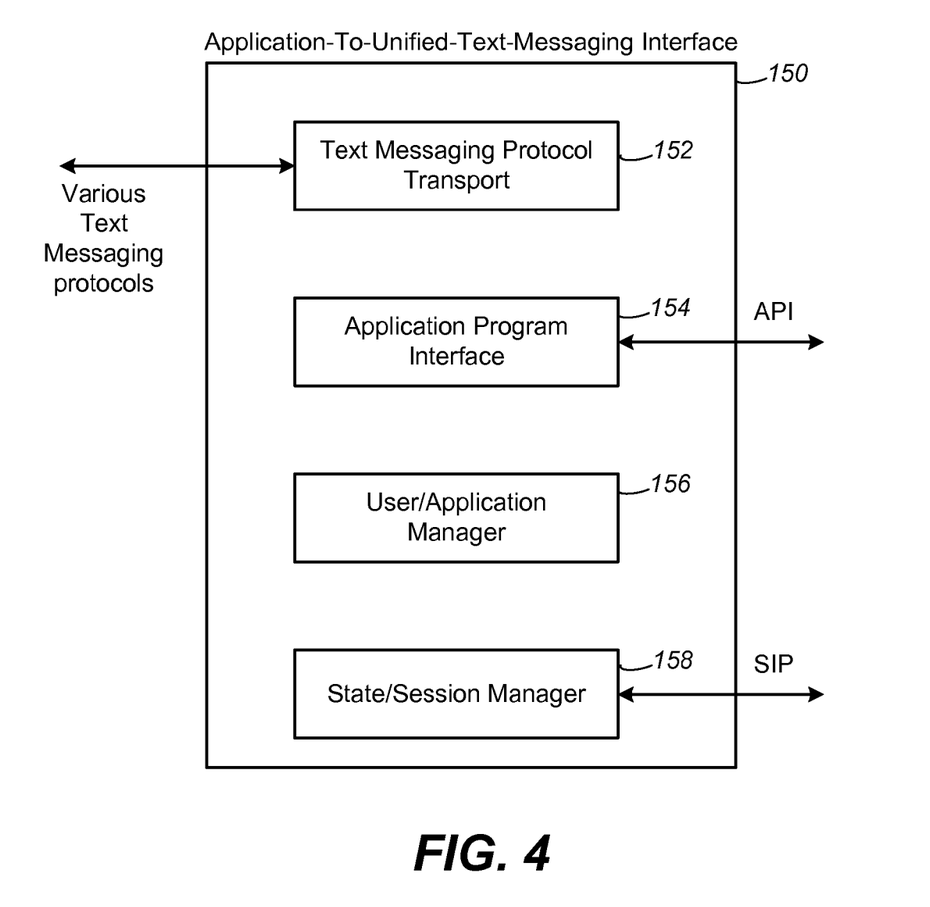
FIG. 4 is a functional block diagram of the application-to-text-messaging interface shown in FIG. 3.

FIG. 4 is a functional block diagram of the application-to-text-messaging interface shown in FIG. 3. The interface 150 includes a set of protocol transports 152, an application program interface 154, a user/application manager 156 and a state/session manager 158. The interface essentially serves at least four functions. The first is to talk to the different text messaging protocols through the set of text messaging protocol transports 152. The second is to provide an application program interface 154 for exchange of media and metadata with the self-help application servlet 140. The third is to keep track of user and application accounts using the user/application manager 156. The four is to have the state/session manager 158 place the messages into a session of the self-help application server 140. The state/session manager 158 examines each incoming message and determines if it belongs to a current session or not. If not, it will signal the application server 140 to start a new session with information obtained from the user/application manager 156.

As mentioned with regard to the IVR described in connection with FIG. 1, the execution of a voice application is conducted within sessions. For the self-help application platform 100 to be compatible with a voice client, session is preferable managed and in this regard, a preferable signaling protocol employed is SIP (Signal Initiated Protocol). Also the execution of a dialog-based, self-help application 110 is generally reduced to traversing a tree of software objects. The location at a position in the tree requires keeping tracking of the route on the tree or past history or states. The browser is storing state related to the application, on every user interaction it needs to know where in the application the execution is taking place, what variables were populated.

On the other hand, text messaging between clients is generally conducted in an open-ended session. While there is "presence" on the network, unlike a voice channel, there is no session defined by a call setup and teardown. Also, there is each message exchanged may be regarded as ad hoc with no particular regard to past history as far as the network is concerned. So text is essentially stateless.

The application-to-text-messaging interface 150 manages the differences mentioned above. In particular, the interface contains functionality to link incoming and outgoing text messages to a session so that a traditional IVR can be used unchanged. The user/application manager 156 manages user accounts with regard to the text messaging networks on the one hand and user accounts with regard to the self-help application. With a given user, it looks up and identifies the self-help application script 110 associated with the given user, which will then be executed by the self-help application server 140. The session/state manager 158 keeps track of the history of messages exchanged and maintains state information. It also notifies the self-help application server 140 to either begin a new session for a given message or end a session or include the message in an existing session. In the preferred embodiment the session/state manager 158 communicates with the self-help application server 140 with regard to sessions using SIP.

Figure 5:
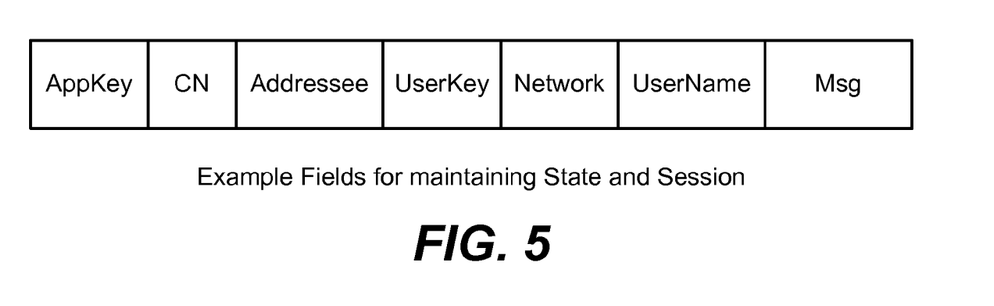
FIG. 5 is an example of some of the fields manipulated by the application-to-text-messaging interface and the self-help application server in order to maintain state information and manage sessions.

FIG. 5 is an example of some of the fields manipulated by the application-to-text-messaging interface and the self-help application server in order to maintain state information and manage sessions.

AppKey—Identifies a self-help Application script with Dialog-specific statements. The Application can be located by an associated URL address.
CN—Telephone number to evoke the Application by a voice client.
Addressee—Name to evoke the Application by a text client. In some IM network, it is a name on the buddy list.
UserKey—Identifies a user of the Application. For example, it can be used to associate the IM user with a user in the self-help application platform to evoke the Application.
Network—Identifies the text messaging network. E.g. Jabber, AIM, MSN, Yahoo, Gtalk, twitter, etc.
UserName—The screen name of the user calling the self-help application. In general it is a function of the network.
Msg—The text of the message sent to the Application. This field is useful for quickly reading the value of the current message sent. For Applications that are command based as opposed to "menu driven", and do not need to maintain "state", the msg variable can be used to read and respond to commands sent to the self-help Application.

Figure 6:
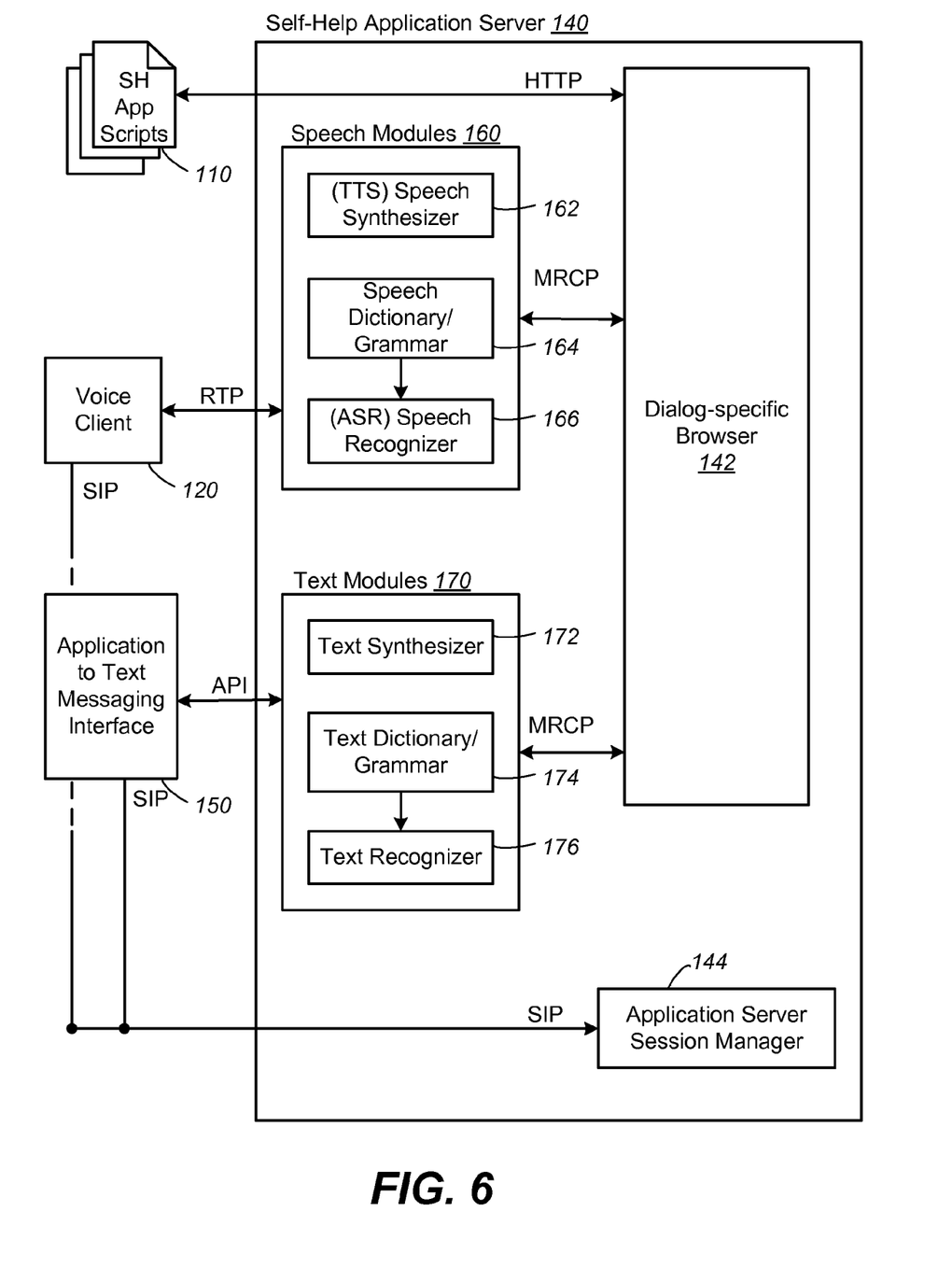
FIG. 6 is a functional block diagram of a self-help application server, according to a preferred embodiment.

FIG. 6 is a functional block diagram of a self-help application server, according to a preferred embodiment. The self-help application server 140 includes a browser 142 for executing any one of a plurality of self-help application scripts 110 to host a self-help Application. As described earlier, the self-help application script includes dialog-specific statements for specifying a dialog-based self-help application. The browser 142 is configured to be able to parse and execute these dialog-specific statements. In one embodiment, the script is interpreted and executed line by line. In a preferred embodiment, the script is compiled into a runtime object code and the browser executes the object code.

The browser 142 is able to execute self-help application scripts implementing an IVR and to process voice in the voice channels. In that situation, the self-help server 140 includes or operates with speech modules 160 which provide voice handling processing and services. Contemporaneously, the browser 142 is also able to execute the self-help application scripts while interacting with a text messaging client through one or more text messaging channels. In that situation, the self-help server 140 also includes and operates with text modules 170 which provide text handling processing and services.

In the preferred embodiment, the speech modules 160 include a speech synthesizer (TTS) 162, a speech recognizer (ASR) 166 and a speech dictionary/grammar module 164 that operates with the ASR 166. ASR stands for Automatic Speech Recognition. In a dialog mode, whether it is speech or text, there will be outgoing messages and incoming messages relative to the multi-channel, self-help application server. In the case of a voice client, outgoing messages from the application server will be speech. If the messages are in the form of text, they will be converted by the TTS to synthesizer speech. Incoming messages from the voice client can be recognized to be one of a finite set of utterances by the ASR. Typically, the dialog in the self-help application script has a menu structure where the client is asked to select one of the menu choices. These predefined menu choices would form entries in the dictionary or constitute a grammar set. The ASR will give a confidence score to any interpretation it recognizes.

In the preferred embodiment, the text modules 170 include a text synthesizer 172, a text recognizer 176 and a text dictionary/grammar module 174 that operates with the text recognizer 176. When dealing with a text messaging client, there will also be outgoing messages and incoming messages relative to the multi-channel, self-help application server 140. In that case outgoing messages from the application server will be text. If the messages are in the form of voice, they will be converted by the text Synthesizer 172 to text. Incoming messages from the text messaging client can be "recognized" by the text recognizer 176 to clean up possible typographical errors and other nonsensical text. Typically, the dialog in the self-help application script 110 has a menu structure where the client is asked to select one of the menu choices. These predefined menu choices would form entries in the dictionary or constitute a grammar set. The text recognizer 176 will give a confidence score to any interpretation it recognizes Thus, the text recognizer 176 serves as a fuzzy text to sensible text module, operating with the text dictionary/grammar module 174 for conforming fuzzy text to a set of predefined sensible text.

In the preferred embodiment, the self-help application server 140 communicates with the speech modules 160 and the text modules 170 via MRCP. Because of the need to communicate with a voice-channel-capable self-help application platform 100, the MRCP protocol is preferably used. MRCP refers to Media Resource Control Protocol (MRCP) and is a communication protocol used by speech servers to provide various speech services (such as speech recognition and speech synthesis). In that context, the speech modules 160 and the text modules 170 may be regarded respectively as speech and text MRCP servers. In other embodiments, other protocols are also applicable. Examples of the other protocols include SMPP, XMPP, TCP and HTTP.

The self-help application server 140 includes an application server session manager 144 that manages the sessions in which users are engaging the self-help application. When dealing with text messaging clients, it will also create new session or close existing session in response to signaling from the state/session manager 158 of the application-to-unified-text-messaging interface 150. After a predetermined period of inactivity with a text messaging client, the session may timeout and may be closed.

There are two modes of operation for the self-help application when interacting with a text messaging client (e.g., an IM client):

1 The IM client is defined by some kind of signaling, this is the case when the IM user initiates the conversation or when performing some kind of outbound IM.

2 The IM user is defined by the application, this is the case where the application is initiated not by the IM user (it could however be a different IM user) and the application decides to establish an IM conversation.

In the first case where the IM user initiates the conversation, it is like the user interacting with an IM bot. For example, a user IMs a weather bot and asks a question like "What is the weather today". The bot might then come back with the weather or ask follow up questions like "for what City would you like to know the weather". In that case the following sequence takes place:

1) The IM message is received by the system 100 and acts like a token
2) The token is translated into a route (in the current prototype and in the picture this is a SIP Message)
3) The browser 142 fetches the corresponding application 110 and continues the IM conversation by sending media to the text synthesizer 172.
4) Any follow up IM messages are processed by the text recognizer 176 and the IM conversation continues based on the application.

In the second case, the application initiates an IM conversation. This is the example where IM is just one of the media paths. E.g. a transfer approval application, i.e. a caller calls a phone number; this triggers an application that sends an IM message to a certain IM client. Dependent on the IM response, e.g. "route to cell" the application continues and transfers the original caller to a certain cell phone number. In that case the following sequence takes place:

1) The session starts of as a usual phone call
2) The application is configured to use an IM media path and sends an IM message to an IM client through the text synthesizer 172.
3) The IM response is received by the text recognizer 176 and returned as an interpretation (with a confidence ranking) to the application.

An example of a sales call to a company deploying a multi-channel self-help application 110 serves to illustrate the operation of the multi-channel, self-help application platform 100.

A potential customer calls the sales hotline.

The call initiates a multi-channel, self-help application associated with the called number. The multi-channel, self-help application appears like a traditional IVR (Interactive Voice Response) application to the caller but also has addition channels for Text messaging interactions.

The caller is being greeted by a welcome voice prompt and, though a series of dialog and responses, navigates to a certain menu item such as wanting to buy a certain high-value item.

In response, the IVR sends text messages out to the sales people specialized in that high-value item, asking them whether they are available to talk to a potential customer. This is done in the IVR script by statements that invoke the text modules and passing in properties that identify the users on the appropriate network. A session is established for every user.

Sales people can respond to the text messages (by sending text messages) and these responses will be returned to the IVR (by the text recognizer in the text modules).

The IVR can then change the flow to the potential customer based on the responses received from the sales people, e.g. transfer the customer's call to one of them.

Figure 7:
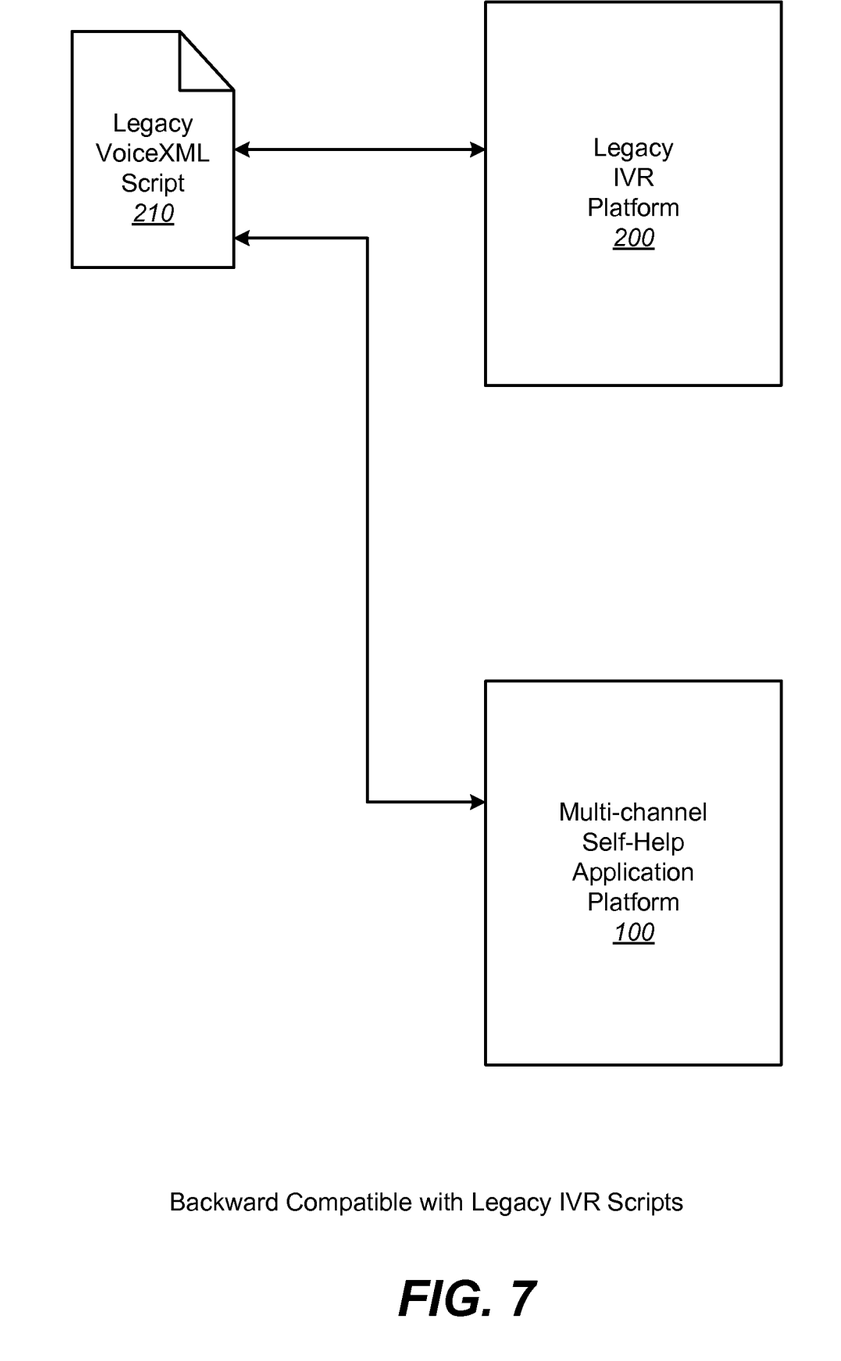
FIG. 7 illustrates the multi-channel, self-help application platform being backward compatible with legacy self-help application scripts.

FIG. 7 illustrates the multi-channel, self-help application platform being backward compatible with legacy self-help application scripts. An IVR 200 is a legacy self-help application platform designed specifically for voice interaction. In other words it is a legacy single-channel self-help application platform. The voice application scripts 210, typically coded with VoiceXML, work with the IVR and are deemed legacy application scripts. One feature of the present multi-channel, self-help application platform 100 is that it is backward compatible with the legacy scripts. A legacy script originally designed to implement a voice application can be hosted by the present platform 100 without modification or with little modifications. To the voice clients, the platform will behave like the original IVR. To the text messaging clients, they will be able to interact with the self-help platform driven by the legacy script. Any voice objects that are inappropriate to the text messaging client could be either converted to text or ignored.

Figure 8:
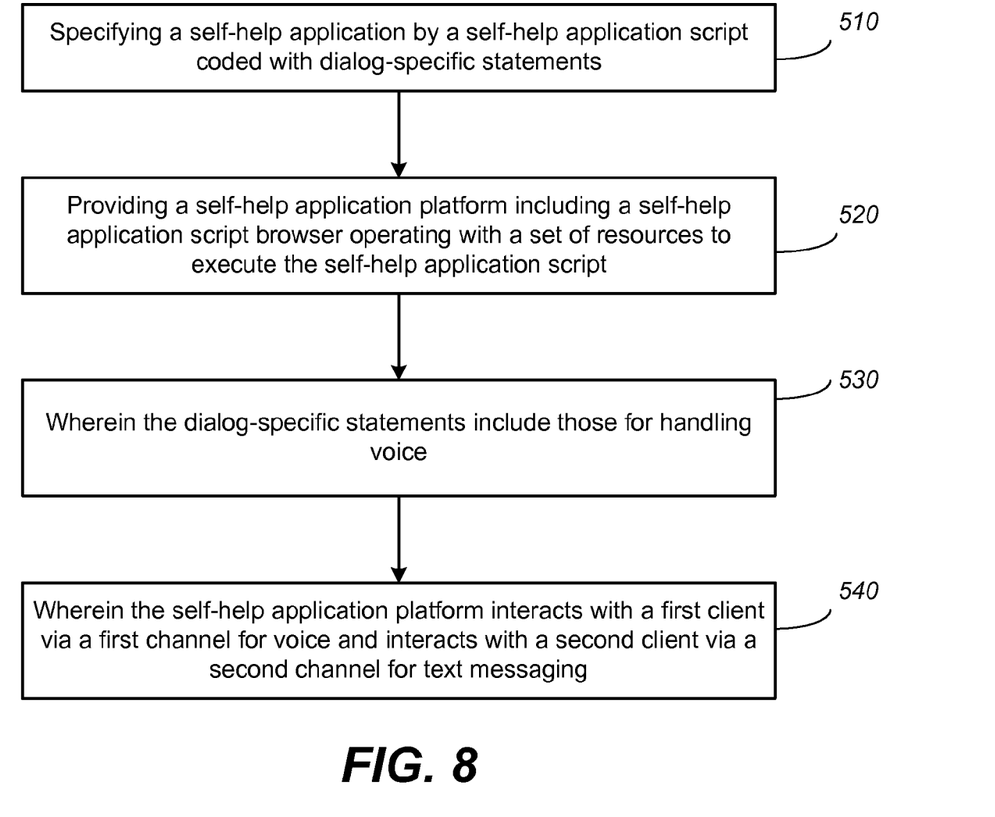
FIG. 8 is a flow diagram illustrating schematically a general embodiment of the invention.

FIG. 8 is a flow diagram illustrating schematically a general embodiment of the invention.

STEP 510: Specifying a self-help application by a self-help application script coded with dialog-specific statements.

STEP 520: Providing a self-help application platform including a self-help application script browser operating with a set of resources to execute the self-help application script.

STEP 530: Wherein the dialog-specific statements include those for handling voice.

STEP 540: Wherein the self-help application platform interacts with a first client via a first channel for voice and interacts with a second client via a second channel for text messaging.

Figure 9:
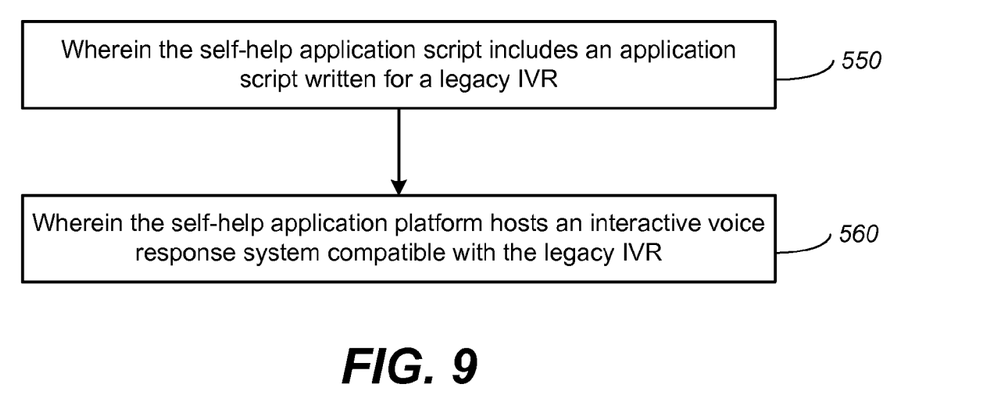
FIG. 9 is a flow diagram illustrating schematically a further feature of the invention.

FIG. 9 is a flow diagram illustrating schematically a further feature of the invention.

STEP 550: Wherein the self-help application script includes an application script written for a legacy IVR.

STEP 560: Wherein the self-help application platform hosts an interactive voice response system compatible with the legacy IVR.

The advantage of the present multi-channel self-help application platform are:

1) One can reuse existing infrastructure already used for phone application
2) It has the same advantages as using XML based languages to write phone applications.
3) There is abstraction of complicated IM concepts the implementation is IM agnostic.
4) It is relative simple to add additional channel within the platform.

While the embodiments of this invention that have been described are the preferred implementations, those skilled in the art will understand that variations thereof may also be possible.

It is claimed:

1. An interactive multi-media response system, comprising:
   an application script constituting an interactive response application;
   a voice application browser;
   a set of voice media resources for rendering said application script to enable a voice client using voice as a media to interact with the interactive response application;
   said set of voice media resources further comprising:
      a speech synthesizer for synthesizing speech from text;
      a speech recognizer for recognizing speech in cooperation with a speech dictionary/grammar to convert speech to text;
   a set of text media resources operating with a voice XML browser for rendering a voice application script to enable a text messaging client using text as a media to interact with the interactive response application; and
   said set of text media resources further comprising:
      an automatic speech recognizer for converting speech to text for output to the text messaging client; and
      a fuzzy-text-to-sensible text module operating with a text grammar for conforming fuzzy text to a set of predefined sensible text for input to the voice XML browser.

2. The system as in claim 1, wherein:
   said application script is a voice application script coded with telephony-specific XML tags constituting the interactive response application.

3. The system as in claim 2, wherein:
   said voice application browser is a voice XML browser.

4. The system as in claim 1, wherein:
   said application script is a dialog application script coded with dialog-specific tags constituting an interactive response application.

5. The system as in claim 4, wherein:
   said voice application browser is a voice XML browser.

6. The system as in claim 1, further comprising:
   a state logger for logging transactions of the text messaging client.

7. The system as in claim 6, further comprising:
a text messaging session manager cooperating with the voice browser and responsive to said state logger to manage a series of transactions of the text messaging client as a session.

8. The system as in claim 7, further comprising:
an interface for conforming to protocols of the text messaging client and the voice browser, said interface responsive to the session manager and the text transactions for transporting text messages between protocols to interact with the interactive response application.

9. A method of operating an interactive multi-media response system, comprising:
providing an application script constituting an interactive response application;
executing the application script with a voice application browser while cooperating with a set of voice media resources for rendering said application script to enable a voice client using voice as a media to interact with the interactive response application, and cooperating with a set of text media resources for rendering said application script to enable a text messaging client using text as media to interact with the interactive response application; and wherein:
said cooperating with the set of voice media resources further comprising:
synthesizing speech from text;
recognizing speech by an automatic speech recongnizer in cooperation with a speech dictionary/grammar to convert speech to text; and
said cooperating with the set of text media resources further comprising:
converting speech to text for output to the text messaging client; and
conforming fuzzy text to a set of predefined sensible text in cooperation with a text grammar for input to the voice XML browser.

10. The method as in claim 9, wherein:
said application script is a voice application script coded with telephony-specific XML tags constituting the interactive response application.

11. The method as in claim 10, wherein:
said voice application browser is a voice XML browser.

12. The method as in claim 9, wherein:
said application script is a dialog application script coded with dialog-specific tags constituting an interactive response application.

13. The method as in claim 12, wherein:
said voice application browser is a voice XML browser.

14. The method as in claim 9, further comprising:
logging transactions of the text messaging client.

15. The method as in claim 14, further comprising:
providing a text messaging session manager cooperating with the voice browser and responsive to said state logger to manage a series of transactions of the text messaging client as a session.

16. The method as in claim 15, further comprising:
providing an interface for conforming to protocols of the text messaging client and the voice browser, said interface responsive to the session manager and the text transactions for transporting text messages between protocols to interact with the interactive response application.

\* \* \* \* \*